US010851967B2

(12) United States Patent
Frison et al.

(10) Patent No.: US 10,851,967 B2
(45) Date of Patent: Dec. 1, 2020

(54) LENS, CORRESPONDING LIGHTING DEVICE, LIGHTING INSTALLATION AND METHOD

(71) Applicant: OSRAM GmbH, Munich (DE)

(72) Inventors: Renato Frison, Chions (IT); Alberto Alfier, Vedelago (IT); Luca Mascolo, Treviso (IT)

(73) Assignee: Osram GmbH, Munich (DE)

(*) Notice: Subject to any disclaimer, the term of this patent is extended or adjusted under 35 U.S.C. 154(b) by 0 days.

(21) Appl. No.: 16/186,650

(22) Filed: Nov. 12, 2018

(65) Prior Publication Data
US 2019/0154230 A1 May 23, 2019

(30) Foreign Application Priority Data
Nov. 17, 2017 (IT) .......................... 102017000131803

(51) Int. Cl.
*F21V 5/04* (2006.01)
*F21V 7/04* (2006.01)
*G02B 3/04* (2006.01)
*G02B 19/00* (2006.01)
*F21Y 113/13* (2016.01)
*F21Y 115/10* (2016.01)
*F21V 8/00* (2006.01)
*G02B 6/42* (2006.01)
*G02B 27/09* (2006.01)

(52) U.S. Cl.
CPC .............. *F21V 5/04* (2013.01); *F21V 7/043* (2013.01); *G02B 3/04* (2013.01); *G02B 19/0014* (2013.01); *G02B 19/0061* (2013.01); *F21Y 2113/13* (2016.08); *F21Y 2115/10* (2016.08); *G02B 6/0001* (2013.01); *G02B 6/4298* (2013.01); *G02B 27/0955* (2013.01); *G02B 27/0994* (2013.01)

(58) Field of Classification Search
CPC ... F21V 5/04; G02B 19/0014; G02B 19/0061; G02B 27/0955; G02B 3/04
See application file for complete search history.

(56) References Cited

U.S. PATENT DOCUMENTS 8,289,473 B2 * 10/2012 Kimura .................. F21V 5/048
 349/61
9,080,739 B1 * 7/2015 Sayers ...................... F21V 5/00
(Continued)

FOREIGN PATENT DOCUMENTS

WO 2016196039 A1 12/2016

OTHER PUBLICATIONS

Italian Search Report based on application No. 10201700131803 (10 pages) dated Jul. 10, 2018 (for reference purpose only).
(Continued)

*Primary Examiner* — Zheng Song
(74) *Attorney, Agent, or Firm* — Viering, Jentschura & Partner MBB

(57) ABSTRACT

A lens for lighting installations including a lenticular body having a planar light input surface and a curved light output surface, with the lenticular body providing a light propagation path from the input surface to the output surface along a lens axis. The curvature values of the output surface includes peak values at the peripheral region and at least one valley value at the central region.

14 Claims, 12 Drawing Sheets

(56) References Cited

U.S. PATENT DOCUMENTS

| | | | |
|---|---|---|---|
| 2007/0109952 A1* | 5/2007 | Jeong | G02F 1/133603 |
| | | | 369/275.4 |
| 2009/0225543 A1* | 9/2009 | Jacobson | F21V 5/007 |
| | | | 362/247 |
| 2009/0284951 A1* | 11/2009 | Muschaweck | G02B 27/0927 |
| | | | 362/97.1 |
| 2010/0002441 A1* | 1/2010 | Ho | G02B 27/0911 |
| | | | 362/277 |
| 2010/0014281 A1 | 1/2010 | Kim | |
| 2010/0188609 A1 | 7/2010 | Matsuki et al. | |
| 2012/0299030 A1 | 11/2012 | Brick | |
| 2013/0229810 A1 | 9/2013 | Pelka et al. | |
| 2014/0009944 A1* | 1/2014 | Fukuda | F21V 5/046 |
| | | | 362/311.08 |
| 2016/0312978 A1* | 10/2016 | Park | F21S 41/143 |
| 2016/0313563 A1 | 10/2016 | Angelini et al. | |
| 2016/0356453 A1* | 12/2016 | Ji | F21K 9/69 |
| 2017/0175974 A1* | 6/2017 | Lee | F21V 5/04 |
| 2017/0205032 A1* | 7/2017 | Dong | G02B 19/0061 |

OTHER PUBLICATIONS

Source Four LED Series 2; https://www.etcconnect.com/Products/Lighting-Fixtures/Source-Four-LED-Series-2/Source-Four-LED-Series-2-Lustr/; 2 pages.

Dalis 860; https://www.robertjuliat.com/ambiance_lighting/Dalis-860.html; 1 page.

\* cited by examiner

LENS, CORRESPONDING LIGHTING DEVICE, LIGHTING INSTALLATION AND METHOD

CROSS-REFERENCE TO RELATED APPLICATION

This application claims priority to Italian Patent Application Serial No. 102017000131803, which was filed Nov. 17, 2017, and is incorporated herein by reference in its entirety and for all purposes.

TECHNICAL FIELD

The description refers to lighting techniques.

One or more embodiments may refer to lenses that may be used in lighting installations, for example, for entertainment environments (stages, theaters, etc.).

BACKGROUND

The entertainment industry may give rise to particular lighting modes.

For example, in the case of the back wall of a stage, designed to provide the background of the scene itself (and for this reason sometimes indicated, perhaps not entirely accurately, as "cyclorama") the quality of lighting may assume, as well as the lighting of the stage floor, a particular importance. Thus, considering the continuous observation by the spectators, there is also the possibility of using the lighting "atmosphere" to achieve effects of various kinds, for example, to give the impression of particular environmental and/or atmospheric conditions, to suggest certain contexts or recall moods, and the like.

In this regard, the uniformity of the lighting, in terms of intensity and color, is particularly important.

The uniformity of lighting may be expressed as a variation of the level in lux ($lm/m^2$) and, as perceived by an observer, it may depend on factors such as:

- high-level derivatives of the lighting at the local level, such as, for example, variations of tens of unit percentages over distances in the order of 1 m, due, for example, to localized spots that could be perceived by the spectators as faults in the lighting installation;
- derivatives of a lower order of the lighting, of the distributed type, such as, for example, variations of tens of unit percentages over distances in the order of about 10 m, usually perceived by the spectators as desired effects.

Similar considerations in the complex also apply to color uniformity, with high-order derivatives, for example, in the order of $3\text{-}5*10^{-3}$ Cx or Cy (color coordinates) over distances in the order of tens of cm, likely to be perceived by the spectators as defects in the lighting installation, and lower-order derivatives, in the order of $3\text{-}5*10^{-3}$ Cx or Cy over distances of a few meters, usually perceived as desired effects.

Achieving high levels of uniformity when this represents a desired effect is, therefore, an objective of interest.

It may also be observed that spectators usually perceive the dispersion (spillage) of the light radiation outside the desired lighting field (for example, outside the cyclorama) as a defect, which may lead to undesired lighting of side walls or of the floor or ceiling.

In the described context, lighting devices of various kinds may be used, such as solid-state lighting sources (for example, with LED sources), even with multiple colors.

Achieving uniform conditions in terms of the level of lighting and/or color may require the use of solutions (even quite complex) aimed at achieving a shaping action of the lighting beams and/or mixing of the colors. This may result in a corresponding increase in installation costs compared to traditional lighting sources.

The mixing of light and/or color radiations may also be influenced by the installation size and conditions (for example, the height and location of the lighting devices with respect to the cyclorama and/or the fact that single or multiple rows of floor and/or ceiling lighting sources are used).

In some cases, it is possible to adjust the placement of the lighting devices, for example, by increasing the distance with respect to a certain wall: this solution may, however, create problems of a different nature, for example, it may limit the space available on the stage.

To take into account these aspects it is possible to resort to linear lamps, oriented parallel to the illuminated surface (for example, to the cyclorama, in the horizontal direction), with the possibility of using reflectors that may perform a function of shaping the lighting beam, for example, in the vertical direction. It is also possible to use bulb lamps (i.e. virtually punctiform sources) together with reflectors designed to perform a function of shaping the light beam in all directions. However, the elements generating the light radiation (e.g. the filaments) are not punctiform and, instead, present increasing dimensions with the power of the lighting device: the result is that a reflector may not be able to perform a complete shaping function of the beam of light at the cyclorama level.

At the level of commercial products, the product available under the name ETC Source 4 Lustr+2 Cyc. comprises a (single) cluster of LED sources that give rise to a multicolored lighting device (engine) coupled with a mixing tube, with a combination of microlenses and reflectors, which is assigned the function of shaping the lighting beam.

This solution allows a good level of homogeneity to be obtained at the output of a light beam, to the detriment of various factors such as, for example:

- the dimensions of the lighting device (particularly in height),
- the distance from the wall required for very tall cycloramas,
- the light distribution starting from the single device, with the need to install several devices side-by-side with a much smaller separation pitch relative to the level of uniformity required,
- the difficulty of containing the dispersion of the radiation outside the illuminated space (for example, outside the cyclorama) for example, at the side walls.

The product available on the market, such as Robert Juliat Dalis 860, envisages the use of clusters of one or more LEDs distributed horizontally along, for example, a cyclorama with each cluster including some LEDs of different colors (by way of non-limiting example 2-4 colors) with a reflector coupled to each cluster.

This solution allows reduction in the overall dimensions of the device, particularly in height, but demonstrating various drawbacks such as, for example:

- the reduced level of color mixing achievable with a single reflector per cluster: at and near the lighting device where the radiations of different colored LEDs are not yet adequately mixed, with the risk that this occurs on the illuminated surface (by way of non-limiting example, on the cyclorama), the considerable distance with respect to the illuminated surface required, for example, for the tallest cycloramas, an uneven lighting distribution in the vertical direction in consideration of the limited shaping power of the reflector, the possible dispersion of the light radiation outside the surface to be illuminated (for example, outside the cyclorama), in particular on the upper walls.

An example envisages arranging a pair of lighting devices at opposite ends of an illuminated surface, with the lighting devices of the pair arranged in a mutually symmetrical manner, and which direct the light radiation towards each other with the possibility of being placed, for example, at the floor and ceiling of a room at a reduced distance (for example 1 m) from a vertical wall. This solution allows a flat and uniform illuminance distribution to be achieved, due to the fact that each device is able to produce an illuminance distribution on the surface which decreases linearly with the distance from the device.

SUMMARY

One or more non-limiting embodiments are aimed at overcoming the drawbacks outlined above, for example, regarding the following aspects:

containment of the dimensions of the lighting device, as a non-limiting example, in height, possibility of achieving a good level of color uniformity in the radiation leaving the lighting device (and not only at the level of the illuminated surface), achievement of a high level of lighting, independently of the dimensions of the illuminated surface (as a non-limiting example, cyclorama), possibility of reducing the distance from the lighted surface (as a non-limiting example, from the cyclorama, when this is required), and containment of the dispersion of light radiation, as a non-limiting example, both in a lateral direction and in a vertical direction with respect to an lighted stage.

According to one or more non-limiting embodiments, this object may be achieved due to a lens having the characteristics referred to in the following description.

One or more non-limiting embodiments may refer to a corresponding lighting device.

One or more non-limiting embodiments may refer to a corresponding lighting installation.

One or more non-limiting embodiments may refer to a corresponding method.

One or more non-limiting embodiments may offer one or more of the following advantages:

simplification of flow/illuminance/intensity scaling operations with the possibility, as a non-limiting example, of increasing the number of elementary units (as a non-limiting example, LED light generator, guiding bar or rod of the light, and free form lens) to facilitate achieving a required goal in terms of flow/illuminance/intensity;

simplification of the design and definition of the device dimensions (in terms of overall dimensions), with the possibility of satisfying specific design needs of the device, possibly combining several elementary units with different form factors, as a non-limiting example, in a linear module or a rectangular or circular module;

possibility of achieving different intensity/lighting distributions within the same installation by replacing a single component (such as the lens) or replacing subunits comprising multiple lenses arranged on a support mounted on a base unit with the possibility of replacing it according to certain lighting needs;

reduction of production and usage costs with the possibility, as a non-limiting example, of using different intensity/illuminance distributions, without having to have a completely different module for this purpose (as we have seen, it is possible to replace, as a non-limiting example, just the lens or groups of lenses), possibility of introducing a motorized zoom system capable of positioning the lens closer, or rather, more distant compared to the radiation generator (or the guiding bar or rod thereof), with the possibility of obtaining zoom effects;

possibility of developing zoom systems able to operate separately on different lenses in order to be able to produce different zoom effects for different radiation generators;

possibility of producing motorization systems able to implement the tilting effects of the beam, possibly operating separately for different radiation generators;

possibility of independently intervening on each light radiation generator (as a non-limiting example, LED), as a non-limiting example, on and off, with the possibility of achieving beam shaping effects without this affecting the lighting uniformity;

possibility of arranging lenses of different types (possibly with associated optical elements of different types) on the same support, with the possibility of creating, as a non-limiting example, radiation configurations with different intensity characteristics (as a non-limiting example, coupling lenses which generate a narrow beam with a certain number of guiding bars or rods, coupling instead to other similar lens structures which generate a wide beam) with, as a non-limiting example, the possibility of creating special lighting effects or simply with the possibility of adapting more quickly to different lighting requirements, as a non-limiting example, during a live show;

simplification of the thermal management of the device, considering the possibility of keeping the light radiation generators (as a non-limiting example, LEDs) well separated from each other, which facilitates the thermal management of the assembly.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various non-limiting embodiments of the invention are described with reference to the following drawings, in which.

DETAILED DESCRIPTION

The following description illustrates various specific details in order to provide a thorough understanding of various examples of embodiments according to the description. The embodiments may be obtained without one or more of the specific details, or with other methods, components, materials, etc. In other cases, known structures materials or operations are not illustrated or described in detail so that the various aspects of the embodiments and not rendered unclear.

The reference to "an embodiment" in the context of the present description indicates that a particular configuration, structure or characteristic described in relation to the embodiment is included in at least one embodiment. Thus, phrases such as "in an embodiment", which may be present at various points in the present description do not necessarily refer to exactly the same embodiment. Moreover, particular configurations, structures or characteristics may be combined in any convenient way in one or more embodiments.

The references used here are provided simply for convenience and therefore do not define the field of protection or scope of the embodiments.

Figure 1:
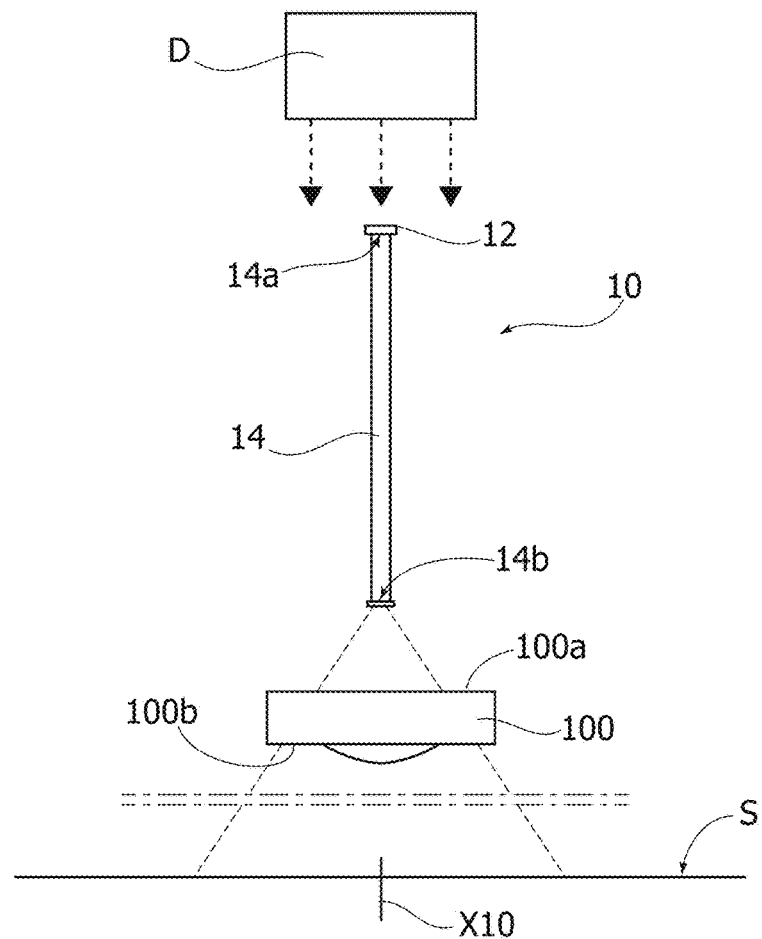
FIG. 1 is a general view of a lighting device according to one or more non-limiting embodiments, exemplifying a possible context of its use.

In FIG. 1, the numerical reference 10 indicates—in its entirety—a lighting device which may be used to illuminate a surface indicated by S.

With reference to the possible application context discussed above (lighting of stages, scenes, theaters, etc.), the surface S may be formed, as a non-limiting example, by the floor or the background (so-called cyclorama) of a stage, which may be illuminated by the device 10 placed at a certain distance from the surface S.

One or more embodiments make it possible to use the device 10 both at a reduced distance from the surface S (as a non-limiting example, to illuminate a cyclorama without obstructing the stage floor), and at a certain distance from the same surface (as a non-limiting example, to illuminate the stage floor from above).

Of course, the reference to this possible field of application is purely exemplary and is not to be understood in a limiting sense of the embodiments.

In one or more embodiments, the lighting device 10 may comprise:

an electrically-powered light radiation source 12; this may be, as a non-limiting example, a solid-state light radiation source, as a non-limiting example, an LED source, optionally multicolored (that is, with emissions in different fields or color ranges), a guiding (and mixing) element of the light 14; this may be, as a non-limiting example, a bar or tunnel which guides the radiation emitted by the source 12 starting from an input end 14a towards an output end 14b, and a lens 100, located in front of the output end 14b of the guiding element 14 so as to receive incoming light radiation coming from the source 12 (as a non-limiting example, through the guiding element 14, whose presence is not, however, imperative) and to send light radiation leaving the device 10 towards the surface S in the direction identified by an axis X10.

As a non-limiting example, the source 12 may comprise one or more light radiation generators (as a non-limiting example, six differently colored LEDs) so that the light radiation emitted by the device 10 along an axis X10 may be controlled (in a manner known per se) by a control unit D, so as to selectively vary, according to various application and use requirements, the intensity and/or color characteristics of the emitted radiation (e.g. power on/off, intensity adjustment or dimming, color variation of the emitted radiation, etc.).

As schematically represented in the upper part of FIG. 1, in one or more embodiments it is possible to use several devices 10 (whether identical or different from each other, as a non-limiting example, regarding the characteristics of the source 12 and/or of the guiding and mixing element 14—if present—and/or of the lens 100), arranged, as a non-limiting example, in linear arrays or in groups: as a non-limiting example, it is possible to consider associating these modules in square or rectangular structures, as a non-limiting example, two rows of eight elements, with the lenses 100, which may be either distinct lenses, or lenses arranged in groups of lenses that share a common support.

These devices 10 may be arranged both at a reduced distance from the surface S (as a non-limiting example, in a row of devices aligned parallelly to a cyclorama) and at a certain distance from the surface S (as a non-limiting example, being arranged on a ceiling for lighting the stage floor from above).

In the same way, the control device D may intervene (according to criteria known per se) to create various possible lighting effects, as already exemplified previously, in order to present possible advantages of the embodiments.

Taken together, this guarantees lighting of the surface S presenting a high level of homogeneity/uniformity both in terms of intensity of lighting (e.g. in terms of illuminance, or rather the relationship between the luminous flux that affects a surface element around the point and the area of the element itself), and at the color distribution level.

Figure 2:
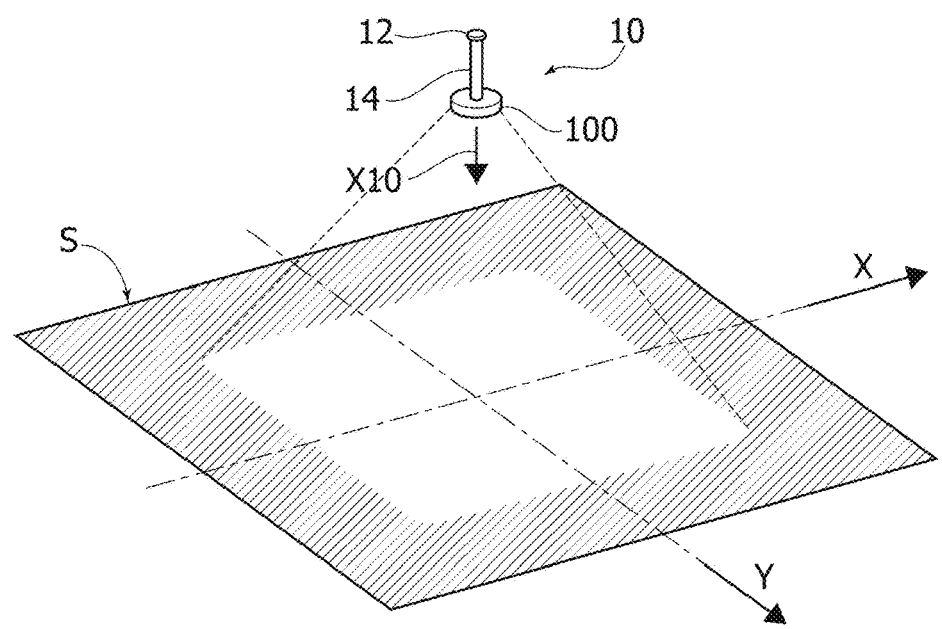
FIGS. 2 to 4 show possible ways of using a device according to embodiments for lighting surfaces of different sizes (large-medium-small)
Figure 3:
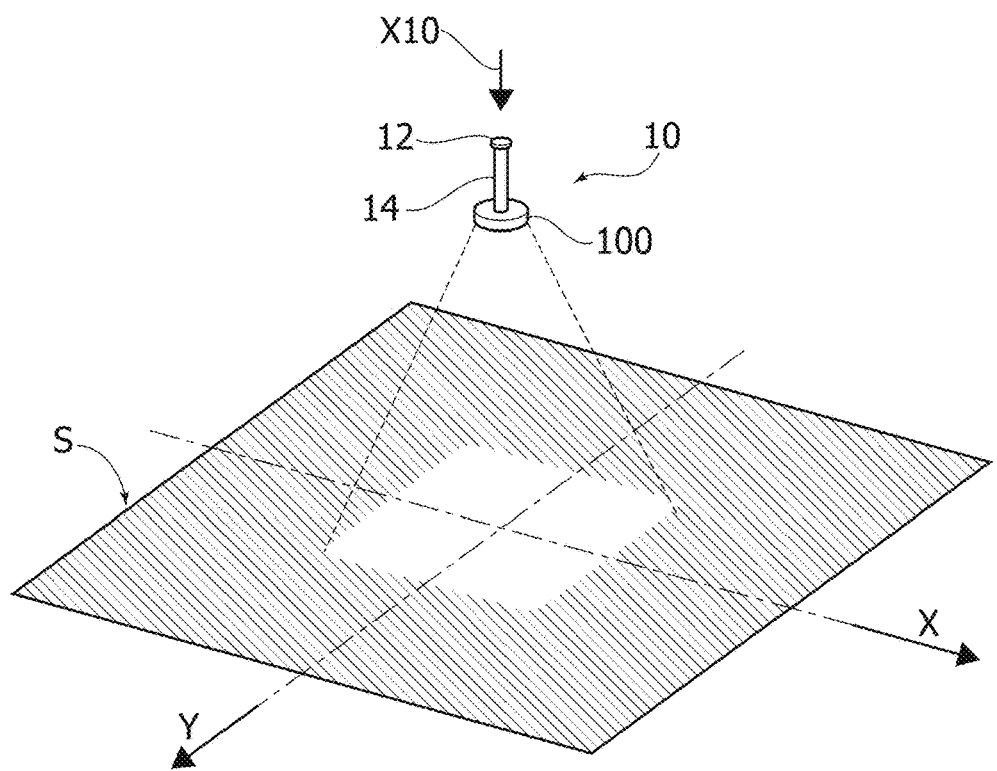
Figure 4:
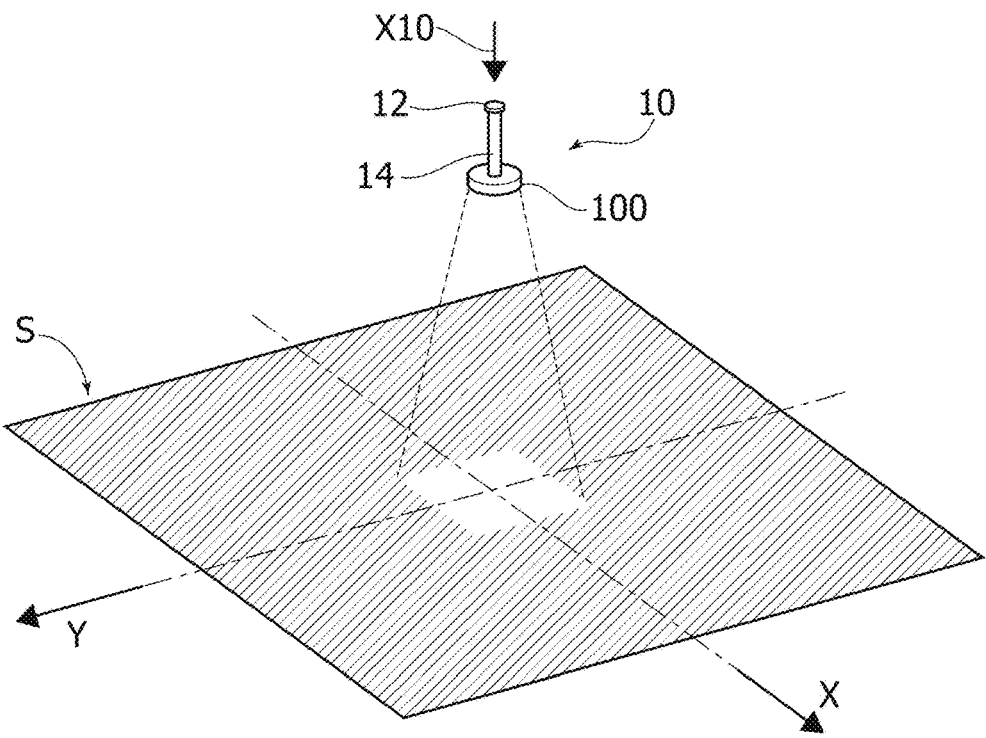

FIGS. 2 to 4 exemplify the possibility, in one or more embodiments, of using devices comprising different lenses 100, capable of providing these lighting characteristics both on a "wide" beam (FIG. 2), and on a beam "of medium width" (FIG. 3), as well as on a "narrow" beam (FIG. 4).

This is carried out by using a single type of lens 100 which may be produced, as a non-limiting example:

with the curvature characteristics illustrated in FIGS. 5 to 12 (to create a wide beam, as exemplified in FIG. 2), with the curvature characteristics illustrated in FIGS. 13 to 18 (to create a medium-width beam, as exemplified in FIG. 3), with the curvature characteristics illustrated in FIGS. 19 to 24 (to create a narrow beam, as exemplified in FIG. 4.

In the following description it will be assumed that, in the lenticular body of the lens 100, two (ideal) sectional planes may be identified, oriented in a first direction X (longitudinal direction) and in a second direction Y (transversal direction), respectively, with these two planes—one perpendicular with respect to the other—intersecting at the center of the lens 100 at a major axis of the lens.

For simplicity of illustration and to avoid unnecessarily weighing down the discussion, in the present description (and in the figures), the denominations X and Y will be used indifferently to indicate both the aforesaid sectional planes and the axes that identify the relative extension directions.

For the sake of illustrative simplicity, it will be assumed that the main axis of the lens 100 corresponds with the axis X10 already described above, along which the radiation which illuminates the surface S is propagated, with a position of the lens 100 (referred to the source 12 and to the guiding and mixing element 14—if present) kept constant.

It will also be appreciated that, as already mentioned above, it is possible in one or more embodiments (as a non-limiting example, under the control of the device D) to change the relative position (as a non-limiting example, the relative distance) between the lens 100 and the source 12. This may happen, as a non-limiting example, due to a motorization (of a known type, not visible in the figures) driven by the device D, so as to obtain zoom effects, possibly de-focusing the light radiation beam, in order to vary the FWHM values along the planes C0-180 and C90-270, being able to "play" on the width of the beam, as a non-limiting example, making the edges of the illuminance distribution on the surface S clearer or less clear. In the same way, it is possible to carry out a tilting or lateral translation of the lens 100 with respect to the axis X10. Again, as already mentioned previously, it is possible to carry out these actions in a differentiated way on different devices 10.

The modularity characteristics of the device 10 illustrated above allow the adoption of different form factors or scaling actions in terms of flux and power with the possibility of intervening simply by replacing the lens 100. The lens may also be arranged together with other lenses (equal or different) in a single support structure so as to be able to rapidly enable the simultaneous replacement of the lenses 100 associated with several devices 10.

FIGS. 2 to 4 refer to the formation, on the surface S, of an illuminated area with an overall rectangular shape with a larger dimension in the direction of the plane X, already introduced previously (X-axis in the figures), and a smaller dimension in the direction of the plane Y, already introduced previously (Y-axis in the figures), with the axis X10 of the lens 100 capable of coinciding (or being in general parallel) with the axis Z of the XYZ Cartesian system thus defined.

By way of non-limiting example, the solution exemplified in FIG. 2 may employ a lens 100 (as exemplified hereinafter with reference to FIGS. 5 to 12), capable of giving rise to a wide intensity distribution with values (asymmetric) of FWHM=57° along the plane C0-180 and FWHM=24° along the plane C90-270, giving rise to a lighting action on an overall rectangular surface.

In this way, it is possible, as a non-limiting example, to optimize the illuminance on a "target" rectangular surface S (as a non-limiting example, the floor of a stage) avoiding dispersion of light radiation (which may be considered undesirable if not annoying) in other regions (as a non-limiting example, on the background wall, on scenic surfaces, on the public).

In one or more embodiments, it is also possible to ensure that the illuminance distribution (defined as the ratio between the lowest illuminance value and the highest illuminance value in the illuminated area) may be maximized, and made virtually unitary, contributing to the pleasantness of the lighting distribution.

Proceeding to replacing just the lens 100 (thus without intervening on the source 12 or on the guiding element 14—if present) it is possible to switch to a lighting solution as exemplified in FIG. 3 with, as a non-limiting example, values of FWHM=28° along the plane C0-180 and FWHM=14° along the plane C90-270.

Once again, by only intervening on the lens 100, it is possible to switch to a lighting distribution as exemplified in FIG. 4 with, as a non-limiting example, values of FWHM=15° along the plane C0-180 and FWHM=10° along the plane C90-270.

It will be appreciated that this flexibility lends itself to being exploited in different ways, as a non-limiting example, by using multiple narrow-beam lighting distributions (FIG. 4) or of medium width (FIG. 3) or, possibly, also wide beam (FIG. 2) to illuminate different areas of the S surface in a different way (as a non-limiting example with different colors) within an almost unlimited range of possible effects.

Meanwhile, uniform conditions are preserved, in terms of intensity and color distribution in the single illuminated area.

The following description is dedicated to a discussion of greater detail of possible characteristics of lenses 100 according to embodiments.

This description refers to a possible use, as exemplified in FIG. 1, in which the lens 100 presents:
- a first surface 100a—which for the sake of simplicity will be assumed to be flat—directed towards the source 12 (or the element 14, if present) and therefore able to act as an input surface of the light radiation, and
- a second surface 100b able to act as an output surface of the light radiation and to be created in a "free form".

The techniques of making "free form" lenses are well known in the art, which makes it unnecessary to provide a more detailed description here.

The lenses 100 as exemplified herein may be made with any material currently used for producing lenses of lighting devices: e.g. polymethyl methacrylate—PMMA, polycarbonate—PC, glass, various types of glass materials, etc.

In the following description, it will also be assumed that, as may be seen in figures such as FIGS. 5, 13 and 19, the lens 100 presents, if viewed in plan, an elongated shape, thus presenting a larger dimension along the X-axis and a smaller dimension along the Y-axis, therefore with a "longitudinal" sectional plane along the X-axis and a "transversal" sectional plane along the Y-axis. Furthermore, it will also be assumed that the possible illustration of characteristics of embodiments of the lens 100 provided hereafter refers primarily to the shape of the "free-form" surface 100b, which may act as the output surface of the light beam from the device 10.

It will be appreciated, however, that this exemplification and the relative terminological choices are dictated primarily by intent of simplicity and clarity of exemplification, and are therefore not to be understood (even implicitly) in a limiting sense of the embodiments.

It must however be noted that the general planar shape of the surface 100a and the fact that the incoming light radiation which hits this surface propagating along the axis X10 cause the refraction mechanism at the base of the lens operation to be mainly manifested at the "free-form" output surface 100b, so that (subject to obvious geometrical considerations, e.g. in terms of size) the thickness of the lens, and therefore the distance between the surfaces 100a and 100b, and the ratio with respect to the dimensions of the lens in the XY plane, do not constitute, at least in first approximation, a particularly critical factor.

Figure 5:
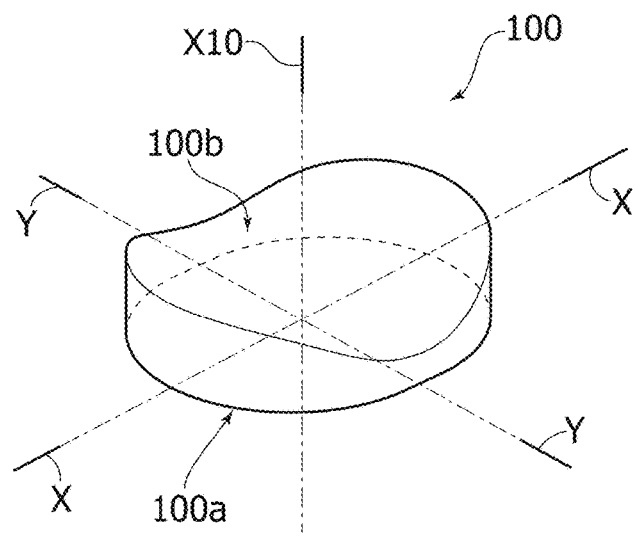
FIG. 5 is a perspective view of a lens according to embodiments.

FIG. 5 exemplifies a possible shape of a lens 100 able to produce a beam for a wide rectangular illuminance, as exemplified in FIG. 2, as a non-limiting example, with values FWHM=56°×28°: referring here to values other than values FWHM=57°×24° previously mentioned with reference to FIG. 2, highlights the fact that the embodiments are not to be considered strictly linked to specific numerical values.

Figure 6:
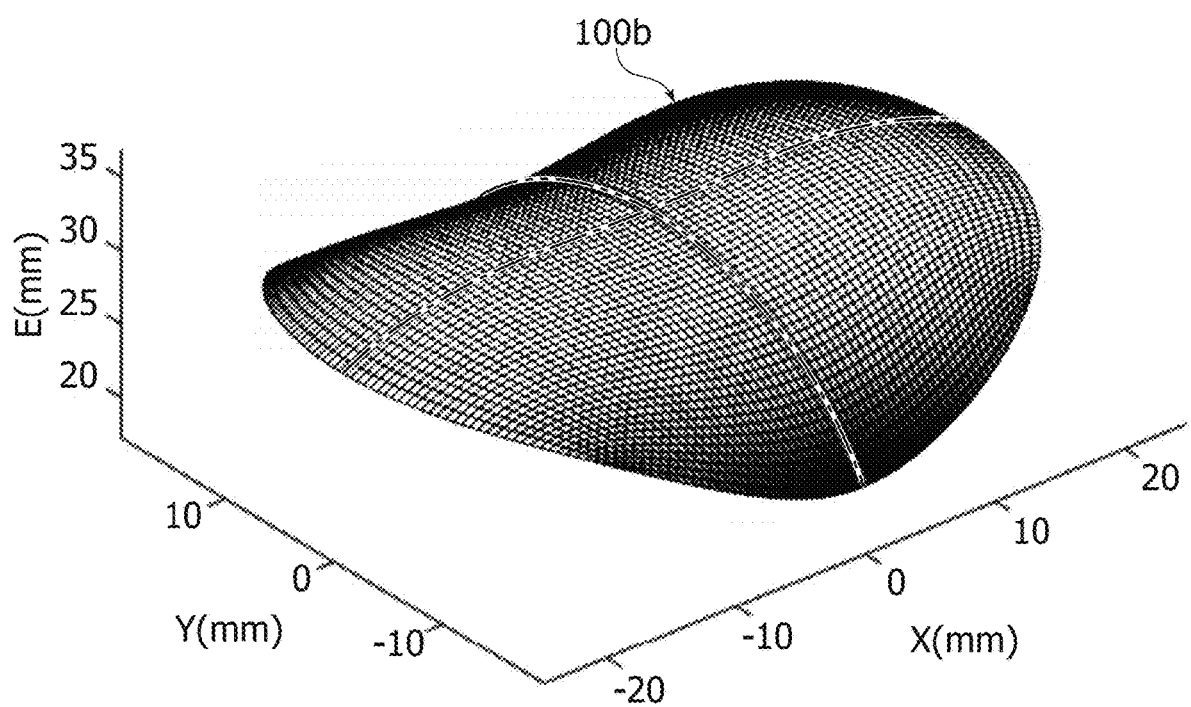
FIG. 6 illustrates the shape of one of the surfaces of the lens of FIG. 5 in greater detail.

In FIG. 6, two sectional profiles of the surface 100b are shown in the longitudinal direction X (dashed and dotted line) and in the transversal direction Y (dashed line and two dots), respectively.

In the lens 100 exemplified in FIG. 5, as well as in the lenses 100 discussed below, the surface 100b has a cylindrical nature, i.e. with the profile of the lens 100 "flatter", on average, along the longitudinal X-axis than the profile along the transverse Y-axis.

As a consequence of this, the optical power of the lens 100 is, on average, lower along the longitudinal axis (where the width of the beam—FWHM—is greater) than that along the transverse axis (where the width of the beam—FWHM—is lower).

The observation of FIGS. 5 and 6 highlights the fact that the aforesaid profiles of the lens 100 cannot be likened to simple circular curvatures (as in the case of a normal spherical lens), instead presenting a more complex pattern.

Observing, in particular, FIG. 6 (as in FIG. 14 and FIG. 20), it may also be appreciated that the surface 100b is a continuous surface, or rather, free from discontinuity (as a non-limiting example, a surface that may be expressed as a derivable function with continuity for a number of times). It has therefore been verified that the curvature characteristics discussed below, detected in the sectional planes X and Y that intersect each other at 90° at the Z axis assumed to coincide with the axis X10, are indicative of the curvature characteristics of the surface 100b as a whole (therefore also in planes passing through the axis X10 and different from the planes X and Y).

Figure 7:
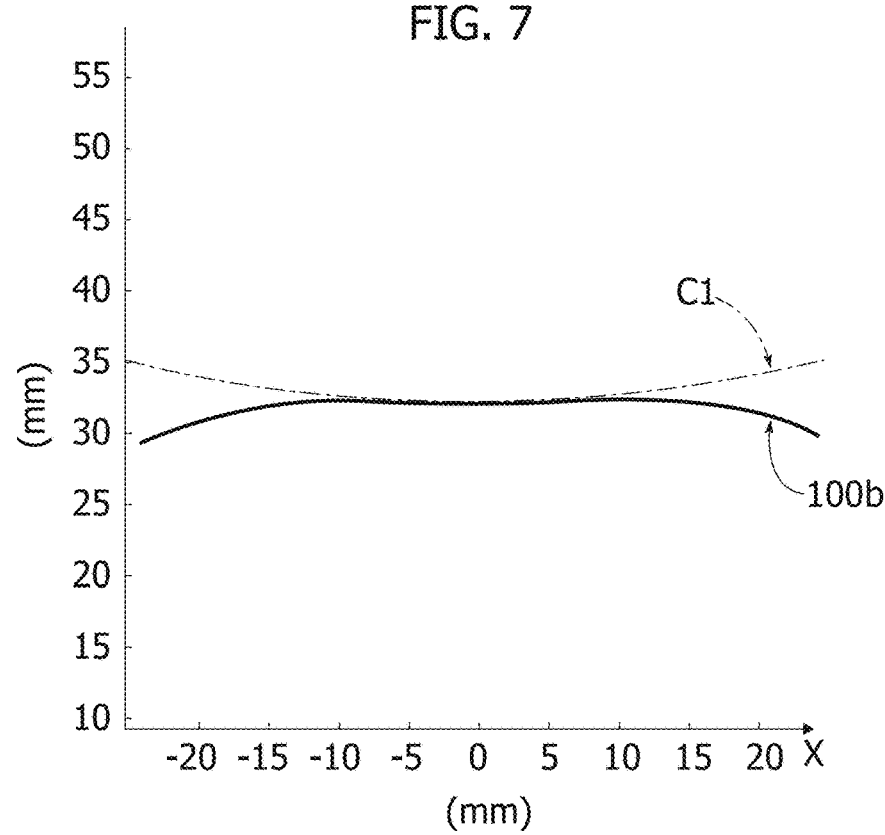
FIGS. 7 and 8 are non-limiting examples of methods that may be used to detect curvature characteristics of lenses according to one or more non-limiting embodiments, FIGS. 9 to 12 exemplify possible trends of the curvature profile of lenses, as exemplified in FIGS. 5 and 6, in a first direction (FIGS. 9 and 10) and in a second direction (FIGS. 11 and 12), respectively.
Figure 8:
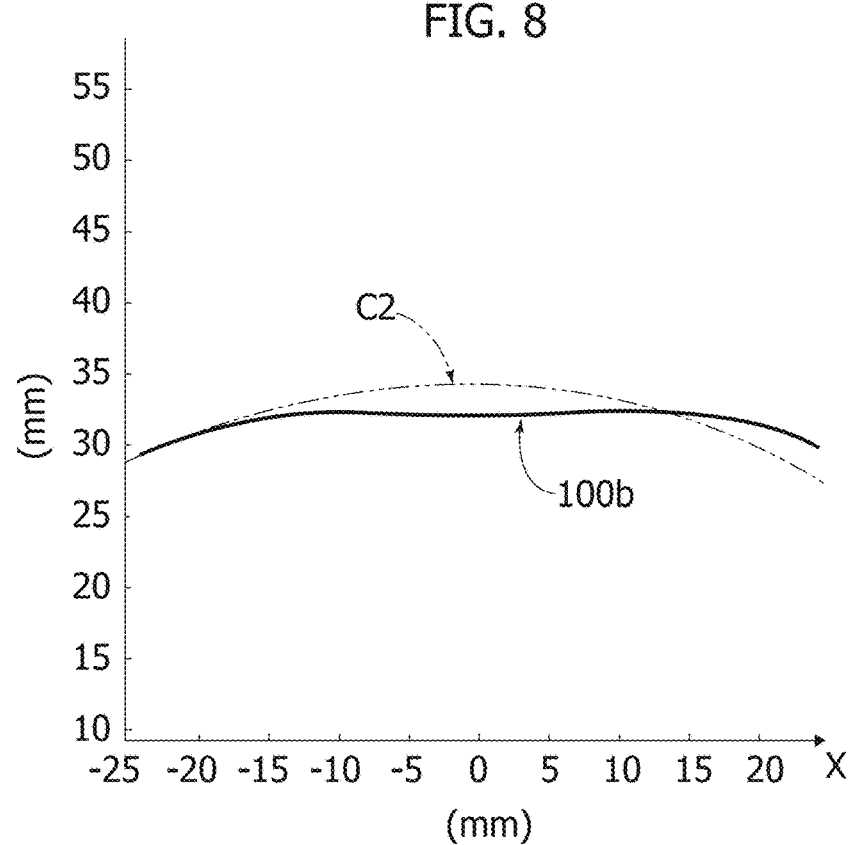

FIGS. 7 and 8 exemplify a possible trend of the longitudinal profile (along the X-axis) highlighting that this profile has a convex pattern at the edges, and concave in the center of the profile. This includes a variable trend with continuity from the left edge (negative values of the X-axis) going towards the center (value 0 of the X-axis) and then specularly repeating from the center to the right edge (positive values of the X-axis).

The terms "convex/convexity" and "concave/concavity" refer here to the surface 100b as observed from the outside of the lens 100 itself.

FIG. 7 highlights the possibility of superimposing a tangent circle (rectius, osculator) C1 on the surface profile 100b with respect to the curve of the profile in the central point (value x=0 of the X-axis) observing that this circle profile corresponds to the real profile only for a portion limited to the center of the lens.

FIG. 8 exemplifies the possibility of superimposing a tangent circle (osculator) C2 at the profile of the surface 100b as well, at an extremal point of the lens (as a non-limiting example, on the left edge, at the end of the negative values of the X-axis).

Compared to the circle C1 referred to the center of the lens, it may be observed that the circle C2 at one end of the profile has:

a different radius of curvature,
a different orientation: the center of circle C1 in fact faces upwards, that is, lying outside the lens 100, while the center of circle C2 faces downwards and, therefore, may be seen as (ideally) situated at the inside of the lens 100.

Figure 9:
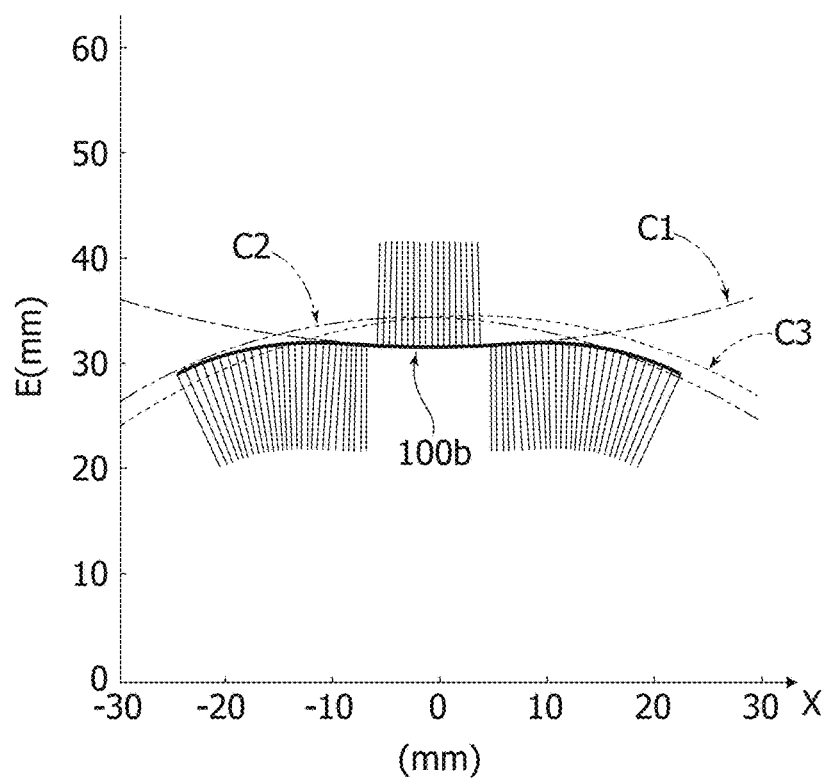

FIG. 9 exemplifies the possibility of extending the same analysis, aimed at identifying the osculating circle, or rather, the tangent circle at the profile of the surface 100b for a certain number of points of the profile included between the extreme left (circle C2) and the extreme right (circle C3), which may be seen as specularly symmetrical with respect to the circle C2.

The "comb-like" representations of FIG. 9 exemplify the possibility of identifying (ideally for each point of the profile of the surface 100b) the direction along which the center of the tangent circle at the profile in that point is located (at a certain distance from the profile of the surface 100b: upwards in the case of the central portion, downwards in the case of the edge portions). The distance between the center of this circle and the tangency point represents the radius of the circle, and provides an estimate of the curvature (defined as the reciprocal value of the radius of curvature) of the surface 100b of the lens at that point.

It is recalled that reciprocal value or—briefly—reciprocal, means (in mathematics) the number that, multiplied by a given number gives a unitary product, so that, as a non-limiting example 0.5 is the reciprocal of 2.

Figure 10:
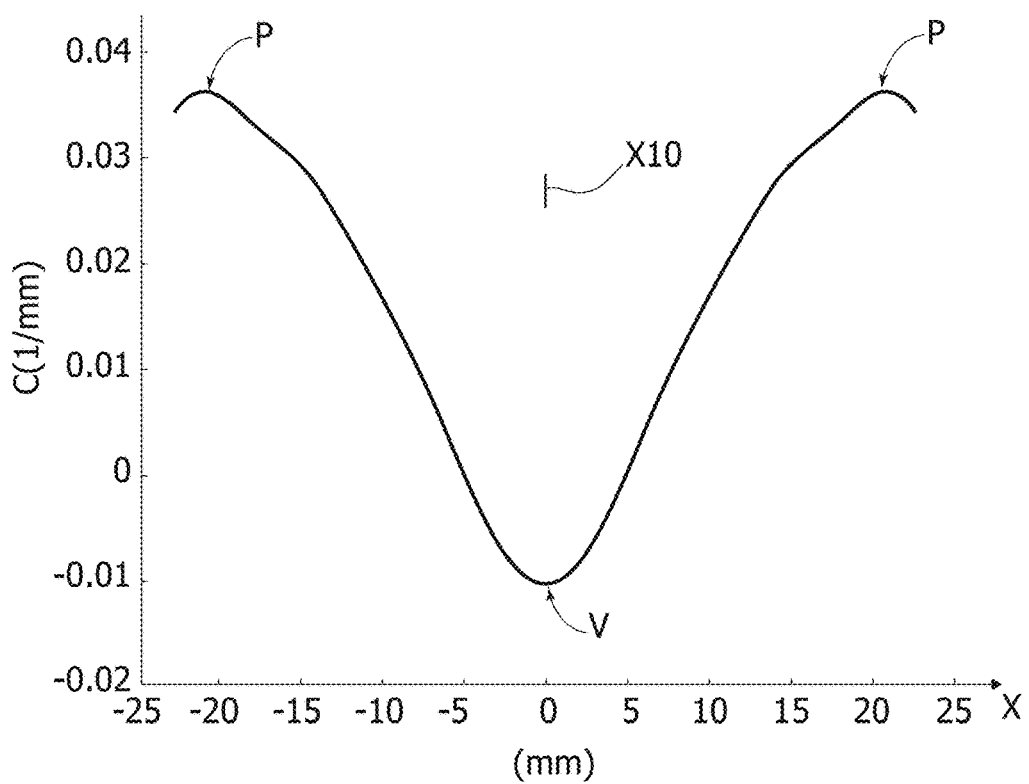

By working with analysis tools (and synthesis) of current use in the field of lens manufacturing, it is possible to promptly know the local curvature of the (longitudinal) profile of the surface 100b of the lens 100, and represent it in a graph, as shown in FIG. 10 (always referring to the X-axis).

In FIG. 10, it may be seen that the curvature (expressed in l/mm) is between a minimum or a valley value (of −0.01 mm$^{-1}$) and a maximum or peak value (of about 0.037 mm$^{-1}$) resulting negative (upwards concavity in FIGS. 7 to 9) in the central region (e.g. for values of x between −6 mm and 6 mm), instead being positive (concavity facing downwards) in the outer region (i.e. for absolute values of x between 6 mm and 23 mm), with a maximum peak P around about 20 mm from the center (x=0).

This assumes representing the curvature as a "oriented" space (with sign), in which a curvature corresponding to a concavity facing towards the outside of the lens (upwards in the figures) is indicated as negative, and a curvature corresponding to a concavity facing towards the inside of the lens (downwards in the figures) is indicated as positive, i.e. with positive curvature values indicative of the convexity of the outer surface (100b) facing towards the outside of the lens (as occurs near the axis X10 for most of the diagrams discussed here), and with negative curvature values indicative of the convexity of the outer surface (100b) facing towards the inside of the lens (as occurs, as a non-limiting example, near the axis X10 for the diagram of FIG. 10 where the profile of the lens, shown in the diagram of FIG. 9, has a convexity facing the inside of the lens, i.e. a concavity facing towards the outside of the lens).

This choice is, however, of a conventional nature may be applied identically with inverted signs.

Figure 11:
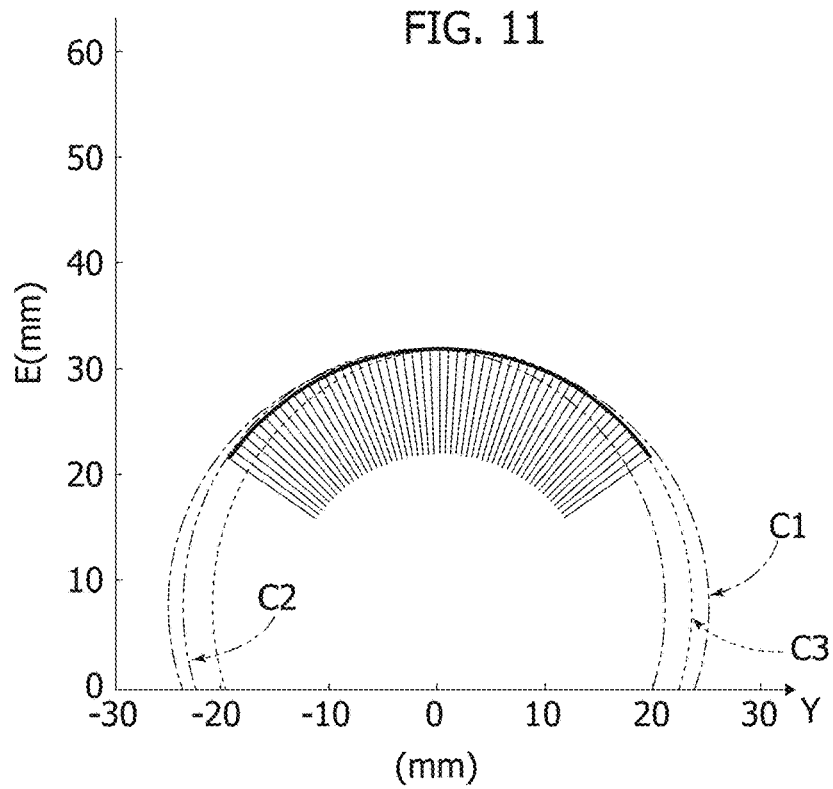
Figure 12:
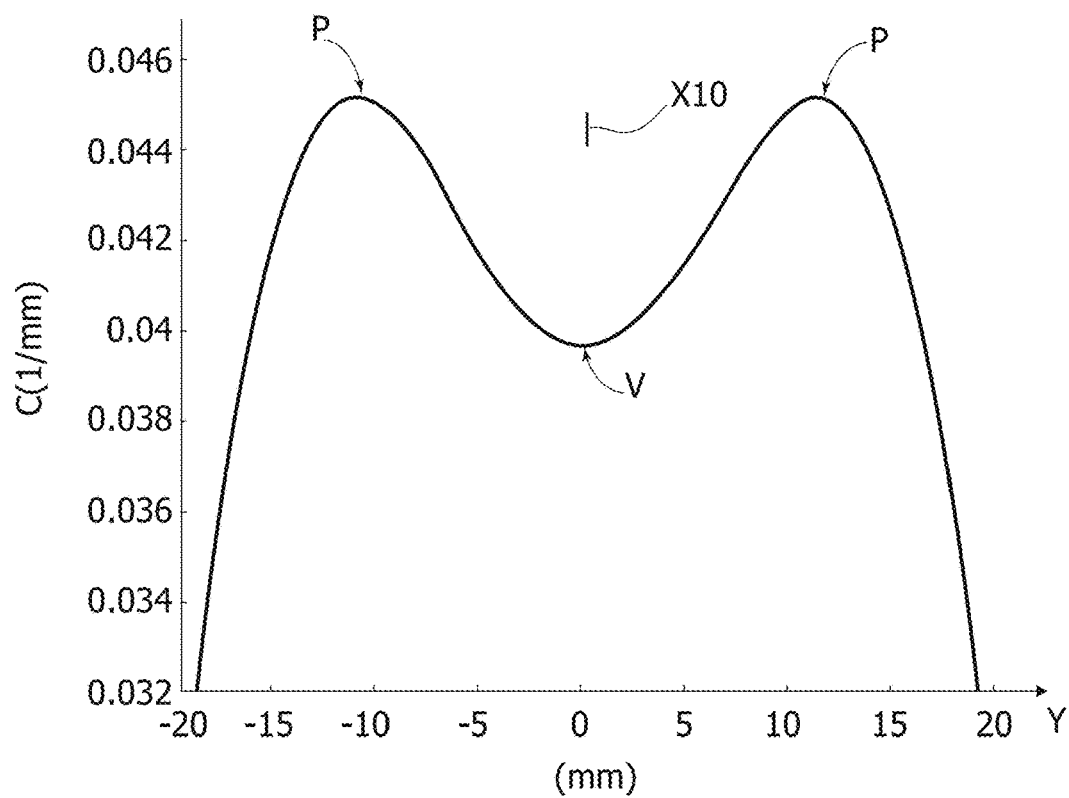

FIGS. 11 and 12 exemplify the fact that an analysis of the type discussed previously with reference to the axis/plane X may be implemented with reference to the axis/plane Y identifying a tangent circle C1 at the center of the profile of the lens, while the circles C2 and C3 represent the tangent circles at the edges of the profile.

In this case as well, as exemplified by the "comb" representation in FIG. 11, it is possible to represent the local curvature of the lens, observing that, unlike the longitudinal profile, in the case of the transverse profile, the concavity always results facing downwards (or rather with the convexity towards the outside of the lens 100, with positive curvature values, according to the convention adopted here) or rather, with the centers of the tangent circles all located downwards (ideally towards the inside of the lens 100). This is also the case if these centers do not fall at a single point, as would happen in the case of a circular profile. The graph in FIG. 12 illustrates how the curvature C values along the Y-axis may be between a minimum or a valley value (of 0.032 mm$^{-1}$) and a maximum or peak value (of 0.045 mm$^{-1}$).

It is also possible to observe that the average value of the curvature of the lens along the transversal direction Y is greater than the mean value of the curvature along the longitudinal direction X. This confirms the fact that, in the direction Y, the lens 100 has greater optical power (i.e. it is able to bend the light rays more and therefore reduce the FWHM value) compared to what happens in the direction X.

Comparing the diagrams of FIG. 10 and FIG. 12, it is further observed that, in both cases, the curvature of the surface has a valley value V at the center of the lens (x=y=0) and two peaks P placed in a lateral position with respect to the center (e.g. for x=±20 mm and y=±12 mm) and then descends again at the end edges of the lens (end values of the x-axis scale in FIG. 10 and y in FIG. 12).

Figure 13:
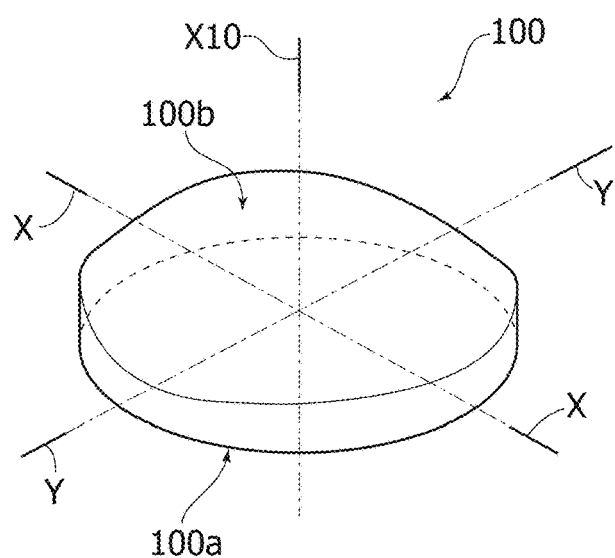
FIG. 13 is a perspective view of a lens according to embodiments.
Figure 14:
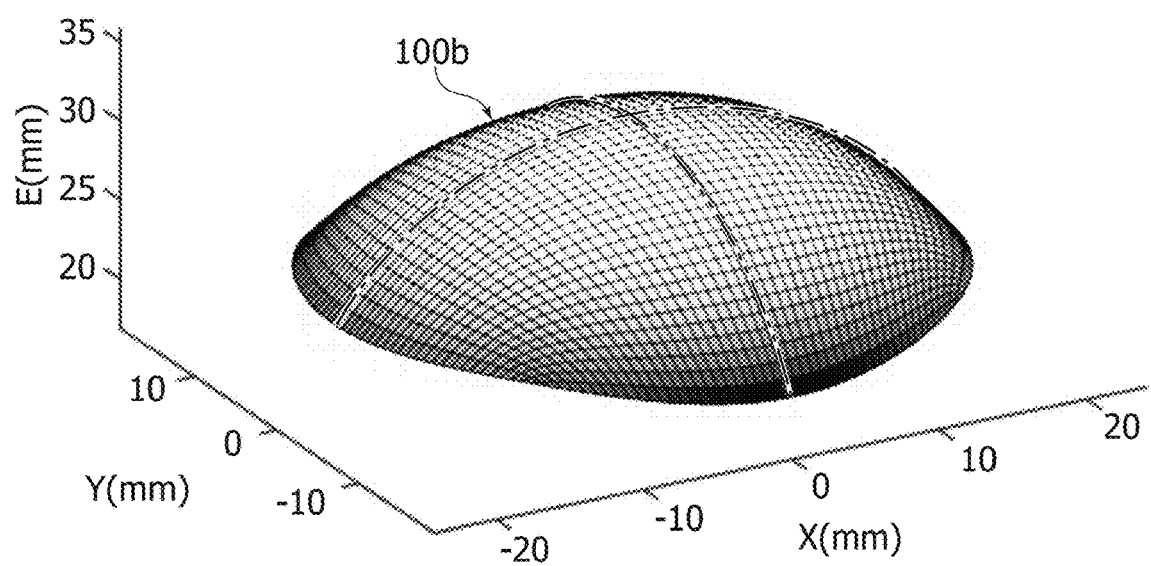
FIG. 14 illustrates the shape of one of the surfaces of the lens of FIG. 13 in greater detail, FIGS. 15 to 18 exemplify possible trends of the curvature profile of lenses, as exemplified in FIGS. 13 and 14, in a first direction (FIGS. 15 and 16) and in a second direction (FIGS. 17 and 18), respectively.

FIGS. 13 to 18 exemplify how the analysis discussed above with reference to the lens 100 of FIG. 5 ("wide" lighting beam—see, as a non-limiting example, FIG. 2) may be applied according to criteria similar to the lens 100 of FIGS. 13 and 14, capable of generating "medium-width" lighting as exemplified in FIG. 3.

In FIGS. 13 to 18, elements or sizes already introduced with reference to the preceding figures (e.g. with reference to FIGS. 5 to 12) are indicated with the same references: for brevity, a corresponding detailed description will not be repeated here.

Figure 16:
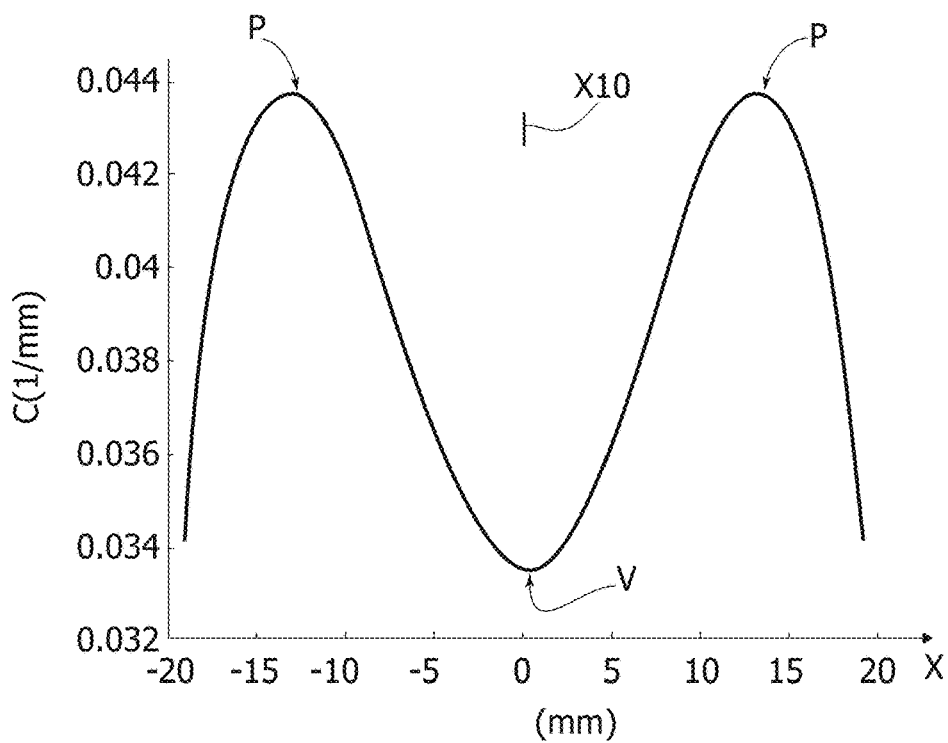
Figure 17:
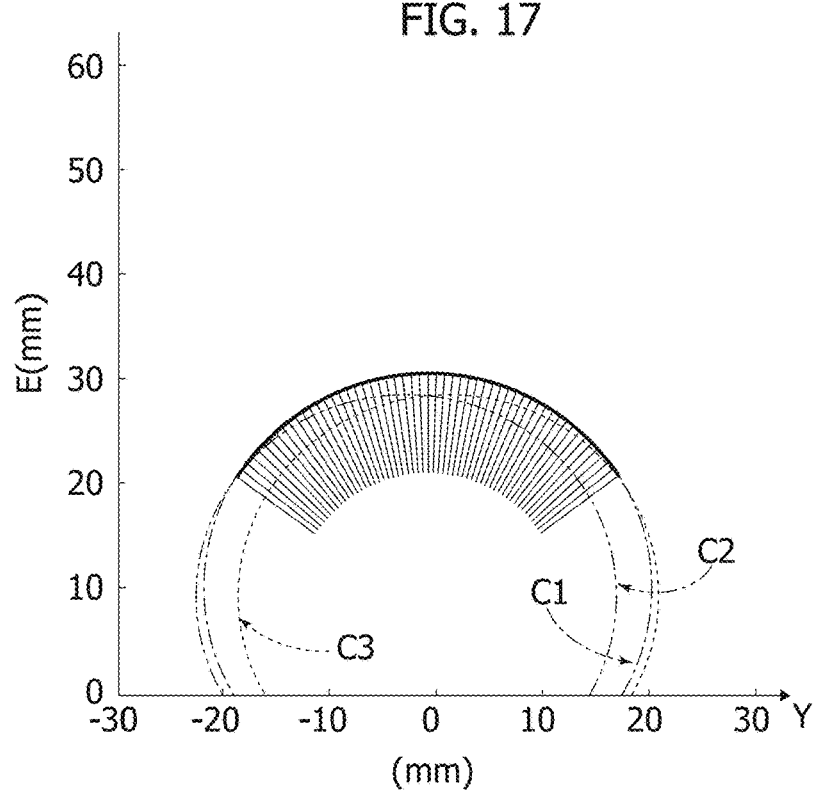
Figure 18:
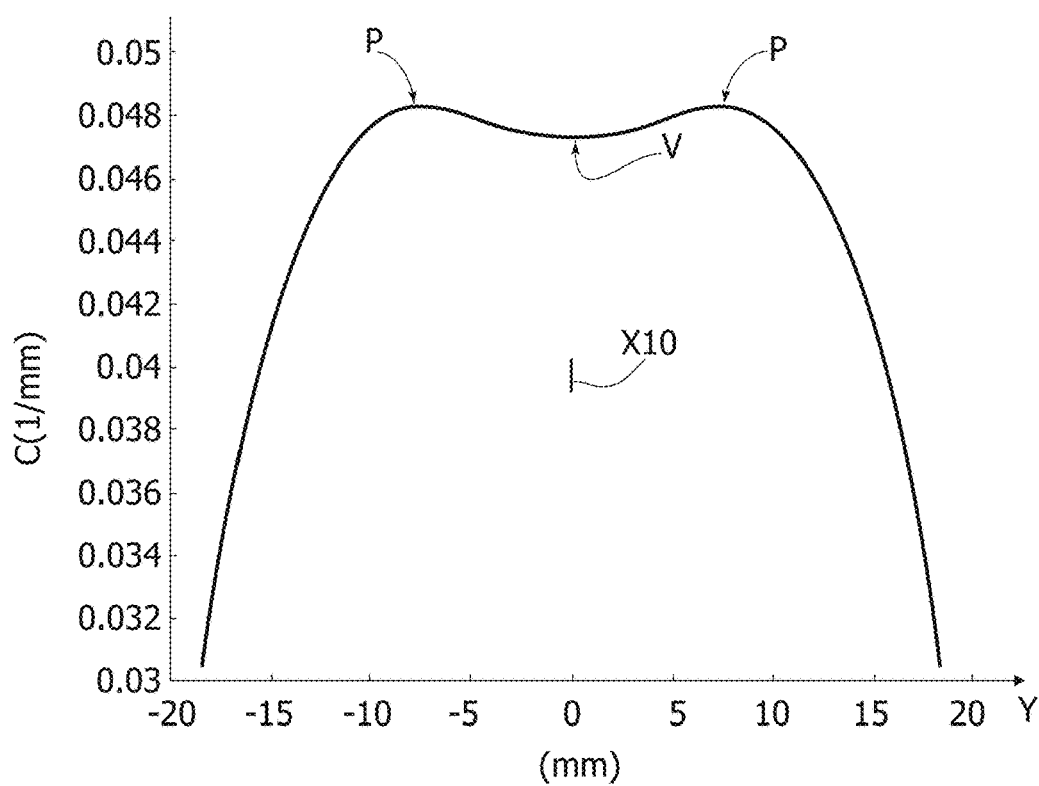

FIG. 14 exemplifies, with reference to the (free-form) surface 100b, the possible presence of a longitudinal profile in the direction X (dashed line and dot) and of a transverse profile in the direction Y (dashed line and two dots) with the consequent possibility, also in this case, to evaluate the trend of the curvature along the longitudinal profile (FIGS. 15 and 16) and along the transverse profile (FIGS. 17 and 18).

Figure 15:
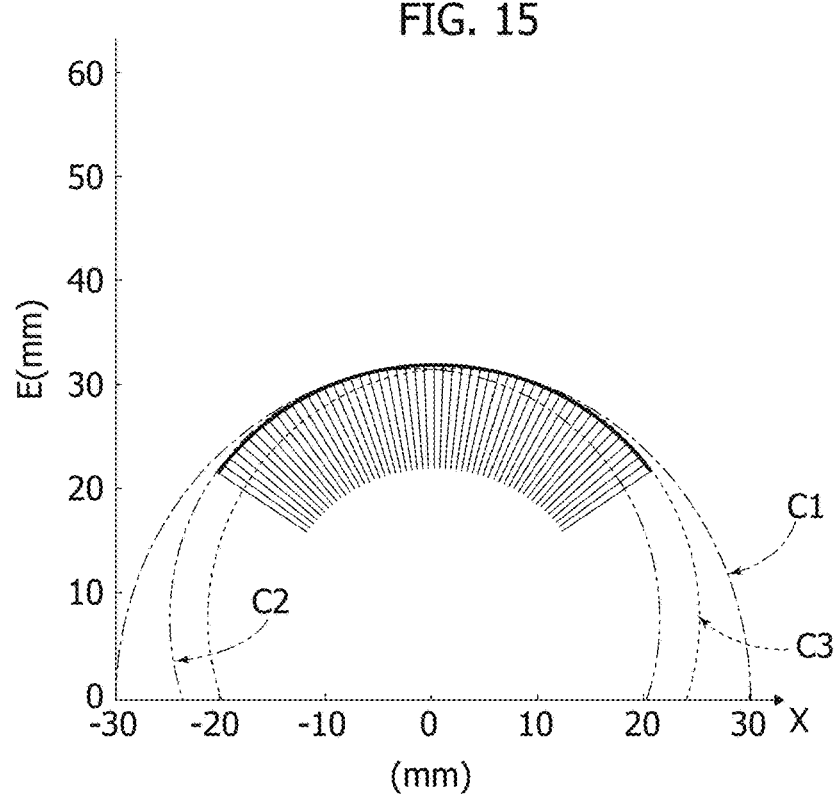

Also in this case, FIGS. 15 and 17 which represent the possible presence of a first tangent circle C1 in a central position, and of two tangent circles C2, C3 in an extremal position with, once again, the possibility of obtaining graphs (those represented in FIG. 16 and in FIG. 18) indicative of the trend of curvature C (reciprocal of the radius of curvature, 1/mm).

All this encounters, in the case of the longitudinal profile of FIG. 16, a curvature between a minimum value (of 0.034 mm$^{-1}$) and a maximum value (of 0.044 mm$^{-1}$). Although always positive (according to the convention adopted previously, or rather, with the rays of the tangent circles all oriented downwards), also in this case, the curvature of the surface 100b has a central valley value V (x=0) between two lateral peak values P (x=13-14 mm).

FIGS. 17 and 18 show that also for the transversal profile in the Y direction, the curvature is always positive (reference is still made to the convention of the signs mentioned above) being between a minimum or a valley value (of 0.03 mm$^{-1}$) and a maximum value (of 0.048 mm$^{-1}$) therefore, also in this case, with the rays of the tangent circles all under the curvature (i.e. virtually inside the lens 100) and, also in this case, a central valley value V (y=0) included between two lateral peak values P (y=9 mm).

In this case as well, as in the case of the lens discussed with reference to FIGS. 5 to 12), it may be observed that the mean curvature value of the longitudinal profile (X-axis) is lower than the mean curvature value along the transverse profile (Y-axis), as evidence of the substantially cylindrical nature of the lens, which therefore has a greater power along one axis—in which the beam is narrower—with respect to the perpendicular axis—in which the beam is wider. Also in this case, comparing the diagrams of FIGS. 16 and 18 with the diagrams of FIGS. 10 and 12, it is possible to encounter the presence of a valley value (minimum) of the curvature C at the center of the lens (X=Y=0) included between lateral peak values P.

Figure 19:
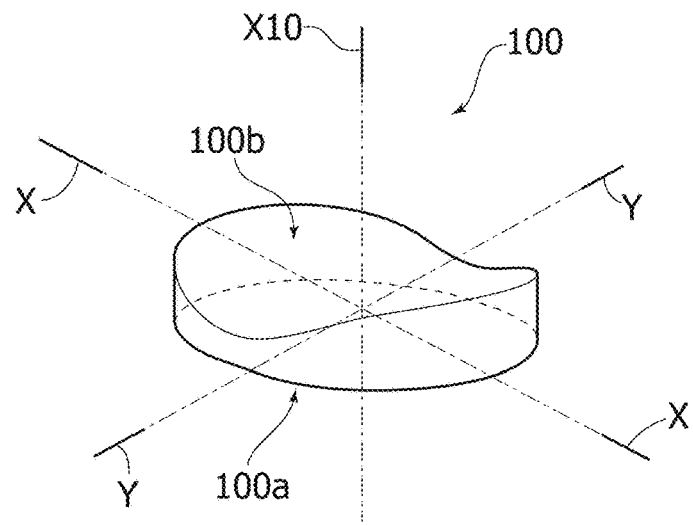
FIG. 19 is a perspective view of a lens according to embodiments.

FIGS. 19 to 24 exemplify the possibility of reproducing the same analysis carried out, first with reference to the lens of FIGS. 5 to 12, and then to the lens of FIGS. 13 to 18, to the lens 100 exemplified in FIG. 19, capable of creating a "narrow" lighting distribution of the type exemplified in FIG. 4.

Figure 20:
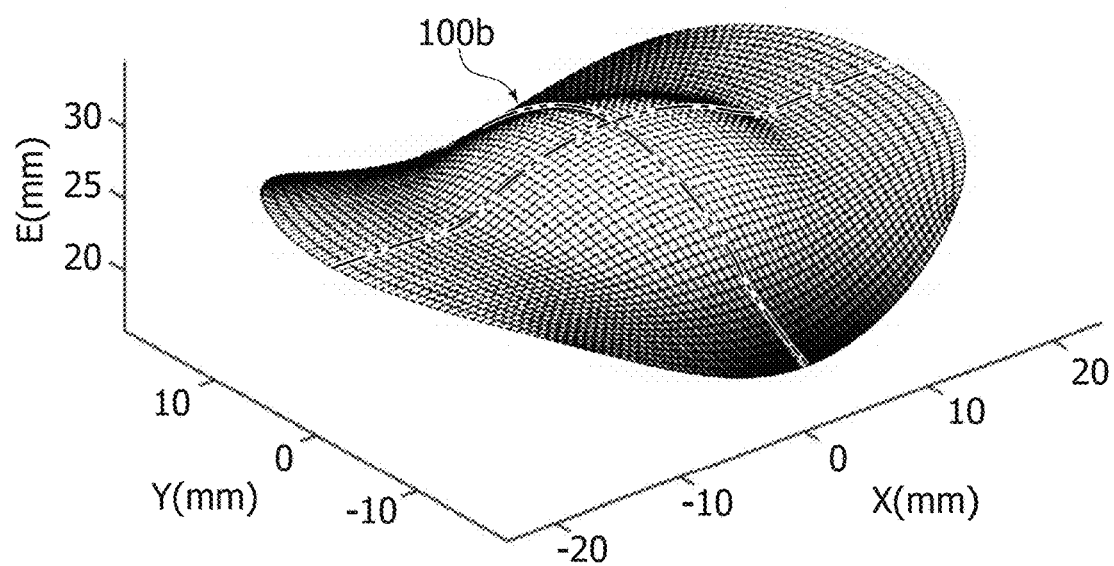
FIG. 20 illustrates the shape of one of the surfaces of the lens of FIG. 19 in greater detail, and FIGS. 21 to 24 exemplify possible trends of the curvature profile of lenses, as exemplified in FIGS. 19 and 20, in a first direction (FIGS. 21 and 22) and in a second direction (FIGS. 23 and 24), respectively.

For the sake of brevity, without repeating a description already given above, in the case of the lens of FIG. 19 as well, the presence is encountered—in the surface 100b—of a longitudinal profile (along the X-axis, with a dashed and dotted line in FIG. 20), and a transverse profile (along the Y-axis, with a dashed line and two dots in FIG. 20).

Figure 21:
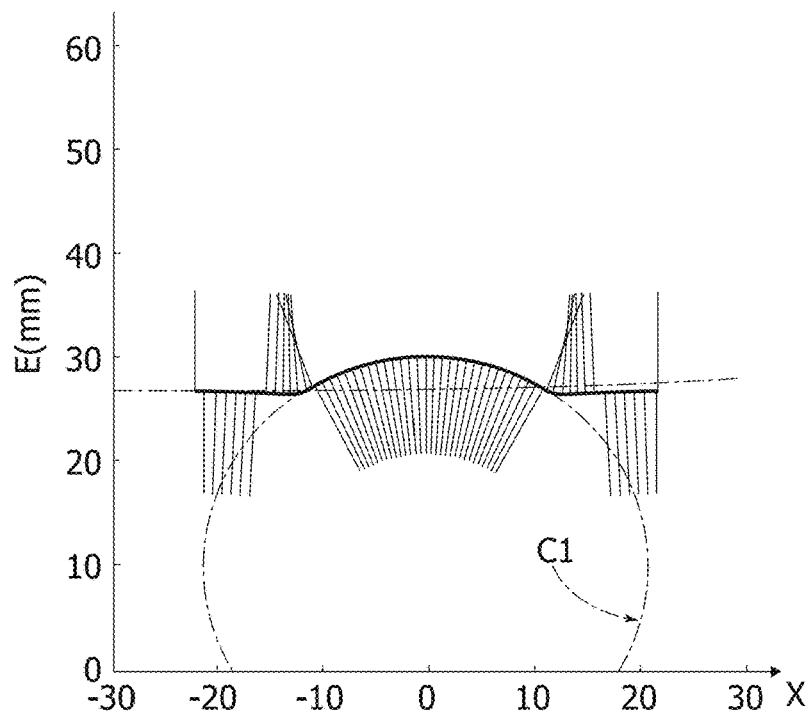
Figure 22:
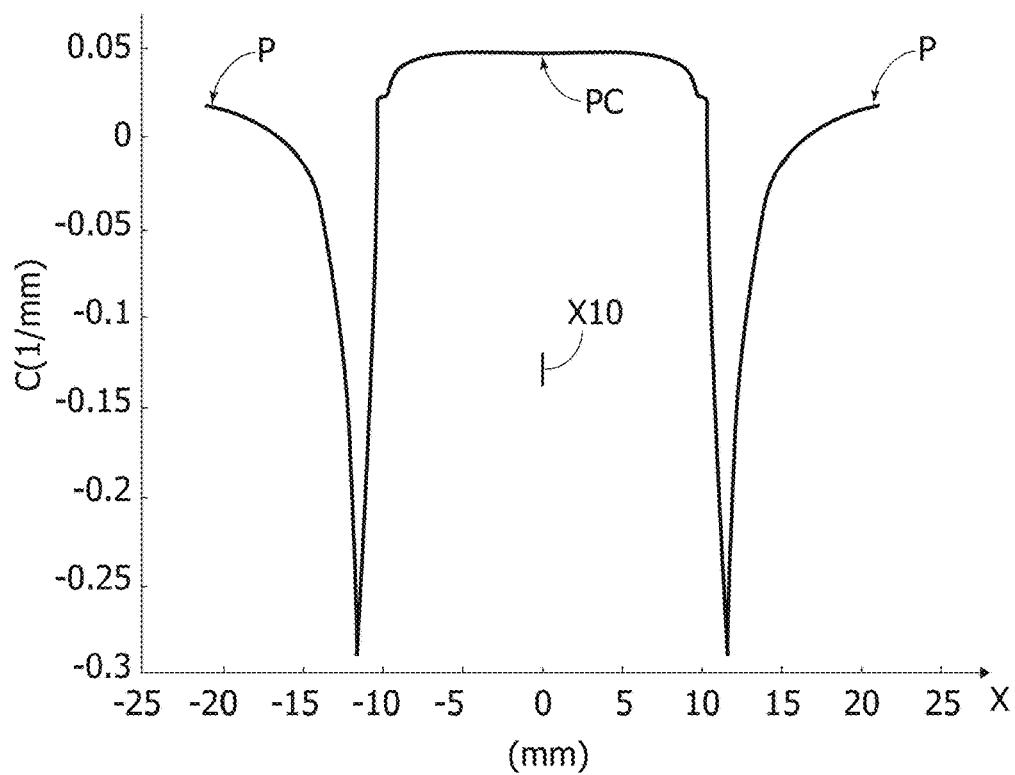
Figure 23:
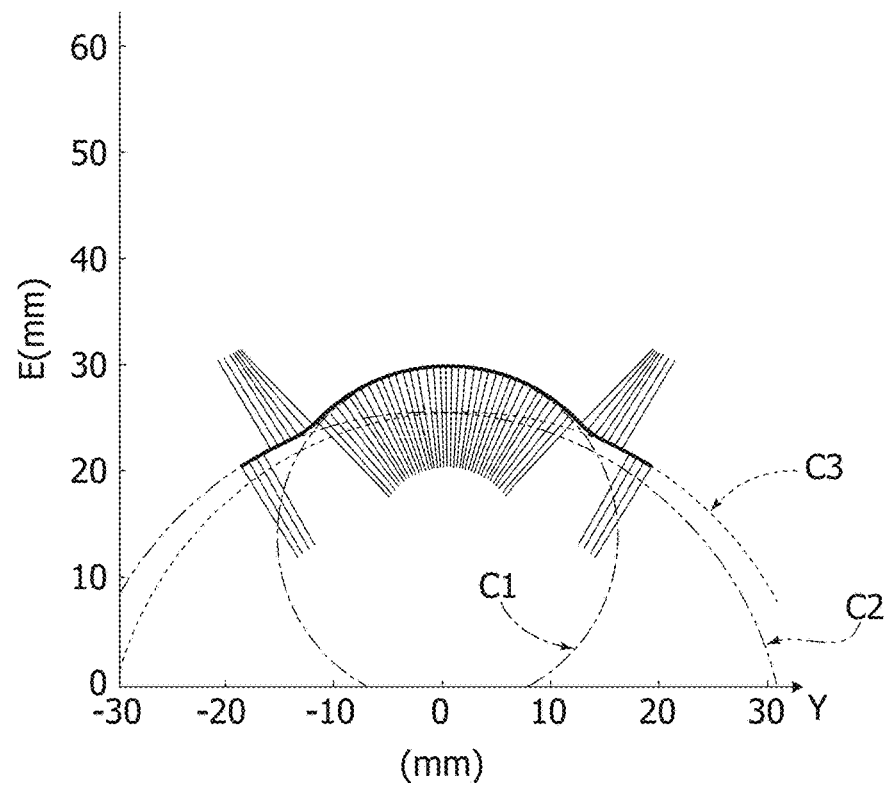

FIGS. 21 and 22 exemplify the possibility, also in this case, to conduct a virtually pointwise analysis of the curvature trend, as a non-limiting example, at the central region of the lens (circle C1 detected for x=0 and y=0) going towards the edges of the lens (circles detected at the extremal position indicated by C2 and C3 in FIG. 23), while a corresponding representation is more critical to provide in the case of the longitudinal profile of FIG. 21 in consideration of the fact that, for values around x=±10 mm, the curvature of the profile presents a sharp change.

In particular, as seen in the diagram of FIG. 22 along the X-axis, the curvature of the lens exemplified in FIG. 19 is positive and substantially constant with a mean value (slightly less than 0.05 mm$^{-1}$) in the central region of the lens (x between −10 mm and +10 mm) and then subject to a rapid reduction, and becomes negative (with a minimum value approximately equal to −0.3 mm$^{-1}$), and then increases again to become positive at the edges of the lens.

A similar overall behavior is also observable along the transversal profile of the lens (diagram of FIG. 24); in this case, the curvature is positive and has a mean value greater than 0.05 mm$^{-1}$ in the central region of the lens (x comprised between −10 mm and +10 mm) to then decrease rapidly, also in this case becoming negative (with a minimum value approximately equal to −0.1 mm$^{-1}$) to then increase again and become positive near the edge of the lens.

In this case too, the mean curvature value of the longitudinal profile along the X-axis is lower than the mean curvature value along the transverse profile of the Y-axis.

Figure 24:
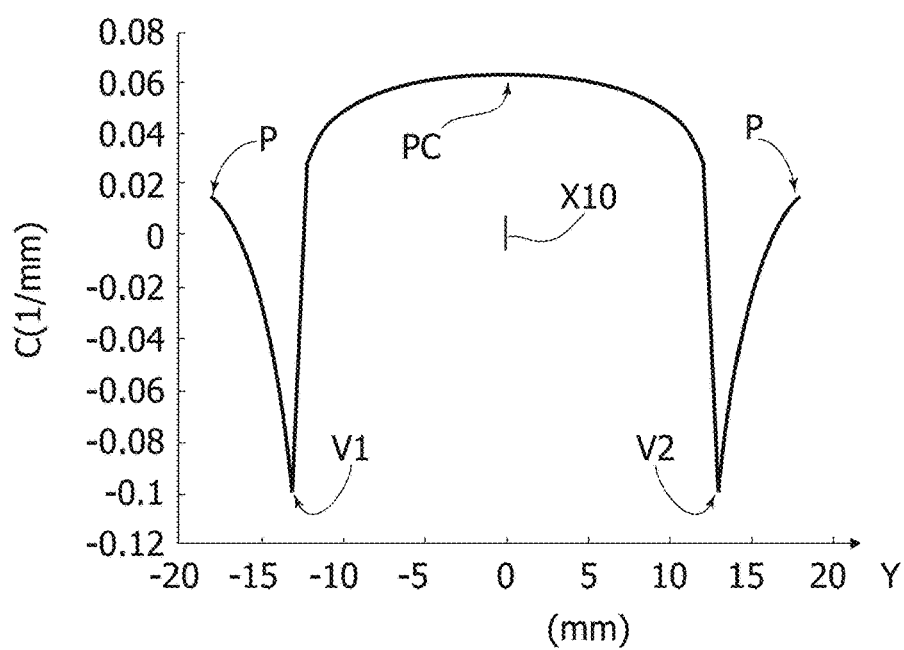

Also in the case of the lens exemplified in FIG. 19, as may be observed in the diagrams of FIGS. 22 and 24, it is possible to encounter the presence of two lateral peak values of the curvature, between which—in this case—the presence may be encountered of not just a single value valley, such as the single valley values V visible in FIGS. 10, 12, 16 and 18, but by two valley values indicated by V1, V2 in FIGS. 22 and 24, between which—in this case—there is a central peak value indicated with PC.

It will be appreciated that referring to "peak" and "valley" values, it is intended to take into account the fact that, while in diagrams such as those of FIG. 10 or 16, the values P and V correspond to maximum and minimum values of the curvature, respectively, this may not be true for other diagrams exemplified here.

For simplicity, limiting to only two cases that could be taken as a non-limiting example:

in the diagram of FIG. 12, the curvature assumes, at the edges of the lens, lower values than the central valley value, which is therefore (at most) a local minimum and not an absolute minimum;

in the diagrams of FIGS. 22 and 24, the curvature assumes, at the center of the lens, a PC value higher than the peak values P at the edges of the lens 100, which are therefore (at most) local maximum values and not absolute maximum values.

The presence of one or two valley regions (V or V1, V2, respectively), between two lateral peak values (indicated by P in all the FIGS. 10, 12, 16, 18, 22 and 24) contributes to the general rectangular profiling of the lighting encountered in FIGS. 2 to 4, while the curvature value at the valley portion(s) helps to identify the overall dimensions of the lighting distribution.

In this regard, it will be noted, as a non-limiting example, that the valley values presented in FIG. 16 and FIG. 18 (medium-width beam) are, respectively, greater than the valley values presented in FIGS. 10 and 12 (lens with a wide profile), with the values encountered in the central portions (around x=y=0 in the diagrams of FIGS. 22 and 24), even higher due to the presence of the intermediate peak PC.

As already mentioned, having seen the continuous, discontinuity-free character of the free-form surface 100b of the lenses here exemplified, the trend of the curvatures detected at the direction of the X-axis (FIG. 10, FIG. 16 and FIG. 22) and the trend detected at the Y-axis (FIG. 12, FIG. 18 and FIG. 24), i.e. at two perpendicular planes intersecting along the axis X10, is representative of the curvature trend of the surface 100b detectable along any plane passing through the axis X10 between the planes corresponding to the X and Y axes.

A lens (e.g. 100) for lighting installations according to one or more embodiments may comprise a lenticular body with an input surface of the planar light (e.g. 100a) and an output surface of the curved light (e.g. 100b), the lenticular body providing a propagation path of the light from the input surface to the output surface along an axis of the lens (e.g. X10), in which the points of the output surface of the lens have curvature values (e.g. C, defined as reciprocal of the radius of curvature of the tangent circle at the surface in the point) with positive curvature values which are indicative of the convexity of the outer surface facing towards the outside of the lens (while negative curvature values are indicative of the concavity of the outer surface facing towards the outside of the lens) in which the lens comprises a central region around the axis of the lens and a peripheral region surrounding the central region, in which the curvature values of the output surface comprise peak values (e.g. P) at the peripheral region and at least one valley value (e.g. V, V1, V2) at the central region.

In one or more embodiments, the lenticular body may comprise a first (as a non-limiting example X) and a second (as a non-limiting example Y) sectional plane perpendicular to each other intersecting at the axis of the lens and in which:

the lenticular body is specularly symmetrical with respect to both the first sectional plane and the second sectional plane, and/or the curvature values of the output surface in the second sectional plane have a higher average value (see, as a non-limiting example, the diagrams of FIGS. 10 and 12, of FIGS. 16 and 18 and FIGS. 22 and 24) with respect to the curvature values of the output surface in the first sectional plane, and/or the lenticular body presents in the first sectional plane a length greater than the length in the second sectional plane (i.e. it is longer in a first direction—X-axis—and shorter in the second direction—Y-axis—perpendicular to the first direction.

In one or more embodiments, the curvature values of the output surface may comprise a single valley value in the central region comprised between the peak values at the peripheral portion (see, as a non-limiting example, the diagrams of FIGS. 10 and 12 and of FIGS. 16 and 18.)

In one or more embodiments, the curvature values of the output surface may comprise a pair of valley values (e.g. V1, V2), optionally negative (concavity), at the central region between the peak values (P) at the peripheral region, with a further peak value at the axis of the lens.

In one or more embodiments, a lighting device may comprise:

at least one lens according to one or more embodiments, and a light radiation source (e.g. 12) coupled (e.g. by means of 14) to the lens and that emits light radiation along the lens axis to propagate through the lens from the light input surface to the light output surface.

One or more embodiments may comprise a guiding and mixing element of the light (e.g. 14) between the light radiation source and the lens.

In one or more embodiments, the light radiation source (e.g. 12) may comprise:

a plurality of light radiation generators, and/or light radiation generators of the LED type, and/or light radiation generators emitting light radiations of different colors.

In one or more embodiments, the relative position of the lens and the light radiation source may be selectively variable (e.g. D).

A lighting installation according to one or more embodiments may comprise:

at least one light radiation source to generate light radiation propagating along an axis, a plurality of lenses according to any one of the claims, the lenses of the plurality of lenses may be coupled to the at least one light radiation source wherein light radiation therefrom propagates along said axis from the light input surface to the light output surface of the lens 100, wherein the plurality of lenses includes different lenses which differ from one another in the curvature values of the light output surface.

In one or more embodiments, the plurality of different lenses may comprise:

at least one first lens (e.g. the one exemplified in FIGS. 5 to 12) having negative curvature values at the axis (e.g. X10) of the lens (hence with a convexity facing towards the inside of the lens, or with a concavity facing towards the outside of the lens: see, as a non-limiting example, FIGS. 9 and 10, for values of x close to zero), and/or at least one second lens (e.g. the one exemplified in FIGS. 19 to 24) wherein the curvature values of the output surface of the lens comprise a pair of valley values, optionally negative (see, for example, the negative values of V1 and V2 in FIGS. 22 and 24), at the central region between the peak values (P) at the peripheral region, with an additional peak value (e.g. PC) at the lens axis.

One or more embodiments may comprise a single light radiation source selectively coupleable to different lenses in the plurality of different lenses.

In one or more embodiments, a method for lighting a surface may comprise:
  installing a lighting device according to one or more embodiments in a position facing the surface, and
  activating the light radiation source in the lighting device wherein a uniform lighting pattern of substantially rectangular shape is formed on the illuminated surface.

Without prejudice to the underlying principles of the invention, the details of construction and the embodiments may vary, even significantly, with respect to those illustrated here, purely by way of non-limiting example, without departing from the scope of the invention.

While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

| List of Reference Signs | |
|---|---|
| Control unit | D |
| Light radiation sources | 12 |
| Guiding and mixing element of the light | 14 |
| Input end | 14a |
| Output end | 14b |
| Illuminated surface | S |
| Lens | 100 |
| Input surface of the light | 100a |
| Output surface of the light | 100b |
| Axis of the lens | X10 |
| Curvature values | C1, C2, C3 |
| Peak value | P |
| Valley value | V, V1, V2 |
| First sectional plane | X |
| Second sectional plane | Y |
| Additional peak value | PC |

What is claimed is:

1. A lens for lighting systems, the lens comprising:
  a lenticular body having a planar light input surface and a curved light output surface,
  the lenticular body providing a light propagation path from the input surface to the output surface along a lens axis, wherein the lenticular body includes first and second mutually orthogonal sectional planes intersecting at the lens axis, wherein the curvature values of the output surface in the second sectional plane have an average value higher than the average value of the curvature values of the output surface in the first sectional plane; wherein the lenticular body is longer along the first sectional plane than along the second sectional plane;
  wherein points of the output surface of the lens have curvature values, with positive curvature values indicative of convexity of the output surface directed outwardly of the lens,
  wherein the lens comprises a central region around the lens axis and a peripheral region surrounding the central region, and
  wherein the curvature values of the output surface of the lens comprise peak values at the peripheral region and a pair of valley values at the central region between the peak values at the peripheral region; wherein a further peak value at the lens axis is arranged between the pair of valley values; and
  wherein the further peak value is equal to or greater than the peak values at the peripheral region.

2. The lens of claim 1, wherein the further peak value is a mean value for the curvature of the output surface of the lens between the pair of valley values.

3. The lens of claim 2, wherein the curvature of the output surface of the lens between the pair of valley values extends for a length of at least 20 mm.

4. The lens of claim 1, wherein the lenticular body is mirror-symmetrical with respect to both the first sectional plane and the second sectional plane.

5. The lens of claim 1, wherein the curved light output surface is a continuous surface and is free from discontinuity.

6. The lens of claim 1, wherein the curvature values of the output surface of the lens comprise a difference of at least 0.1 mm$^{-1}$ between the valley values at the central region and the peak values at the peripheral region.

7. The lens of claim 1, wherein the curvature values of the output surface of the lens comprise a difference ranging from about 0.1 mm$^{-1}$ to about 0.3 mm$^{-1}$ between the valley values at the central region and the peak values at the peripheral region.

8. A lighting device, comprising:
  at least one lens, the lens comprising:
    a lenticular body having a planar light input surface and a curved light output surface,
    the lenticular body providing a light propagation path from the input surface to the output surface along a lens axis, wherein the lenticular body includes first and second mutually orthogonal sectional planes intersecting at the lens axis, wherein the curvature values of the output surface in the second sectional plane have an average value higher than the average value of the curvature values of the output surface in the first sectional plane; wherein the lenticular body is longer along the first sectional plane than along the second sectional plane;
    wherein the points of the output surface of the lens have curvature values, with positive curvature values indicative of convexity of the output surface directed outwardly of the lens,
    wherein lens comprises a central region around the lens axis and a peripheral region surrounding the central region,
    wherein the curvature values of the output surface of the lens comprise peak values at the peripheral region and a pair of valley values at the central region between the peak values at the peripheral region, wherein a further peak value at the lens axis is arranged between the pair of valley values; and
    wherein the further peak value is equal to or greater than the peak values at the peripheral region; and
  a light radiation source coupled with the lens to emit along the lens axis light radiation to propagate through the lens from the light input surface to the light output surface.

9. The lighting device of claim 8, comprising a light guiding and mixing element between the light radiation source and the lens.

10. The lighting device of claim 8, wherein the light radiation source comprises:
   a plurality of light radiation generators, and/or
   light radiation generators of the LED type, and/or
   light radiation generators emitting light radiations of different colours.

11. The lighting device of claim 8, wherein the relative position of the lens and the light radiation source is selectively variable.

12. A lighting installation comprising:
   at least one light radiation source to generate light radiation propagating along an axis,
   a plurality of lenses, each lens comprising:
      a lenticular body having a planar light input surface and a curved light output surface,
      the lenticular body providing a light propagation path from the input surface to the output surface along a lens axis, wherein the lenticular body includes first and second mutually orthogonal sectional planes intersecting at the lens axis, wherein the curvature values of the output surface in the second sectional plane have an average value higher than the average value of the curvature values of the output surface in the first sectional plane; wherein the lenticular body is longer along the first sectional plane than along the second sectional plane;
   wherein points of the output surface of the lens have curvature values, with positive curvature values indicative of convexity of the output surface directed outwardly of the lens,
   wherein the lens comprises a central region around the lens axis and a peripheral region surrounding the central region,
   wherein the curvature values of the output surface of the lens comprise peak values at the peripheral region and a pair of valley values at the central region between the peak values at the peripheral region, wherein a further peak value at the lens axis is arranged between the pair of valley values; and
   wherein the further peak value is equal to or greater than the peak values at the peripheral region;
   wherein the plurality of lenses are coupleable to the at least one light radiation source wherein radiation therefrom propagates along said axis from the light input surface to the light output surface of the lens,
   wherein the plurality of lenses includes different lenses which differ from one another for the curvature values of the light output surface.

13. The lighting installation of claim 12, wherein the plurality of different lenses comprises:
   at least one first lens having negative curvature values at the lens axis,
   at least one second lens wherein the curvature values of the output surface of the at least one second lens comprise a pair of valley values at the central region between the peak values at the peripheral region, with a further peak value at the lens axis.

14. The lighting installation of claim 12, including a single light radiation source selectively coupleable to different lenses in the plurality of different lenses.

* * * * *